May 12, 1925.
R. R. TEETOR
PISTON
Filed May 17, 1924
1,537,631
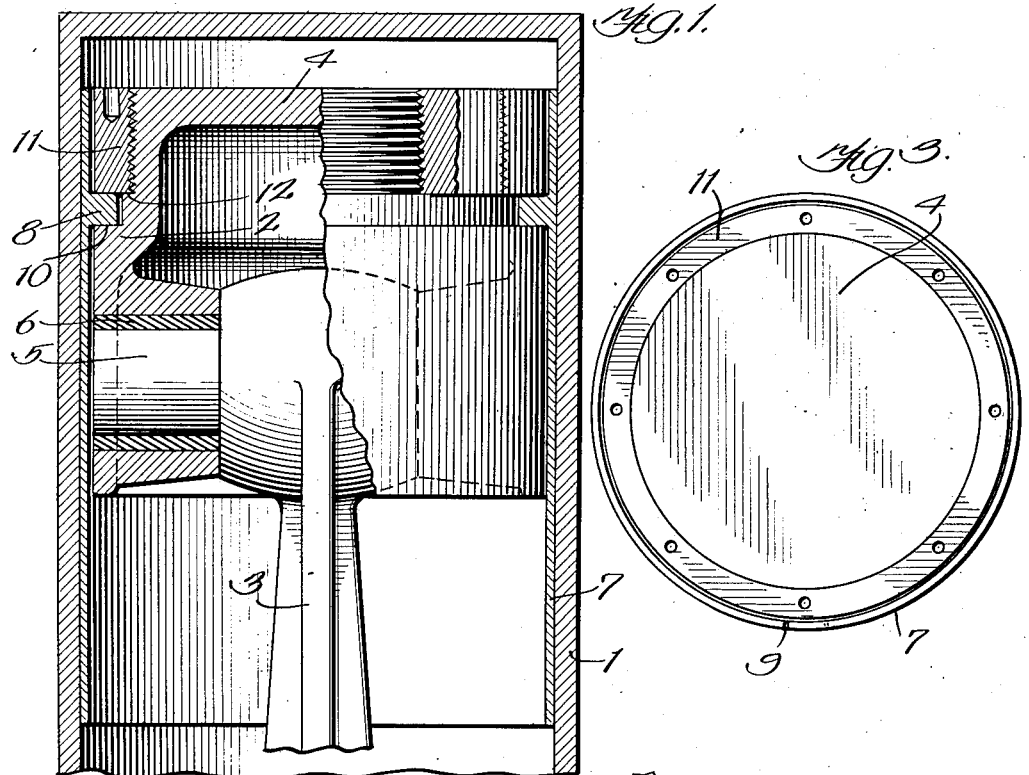
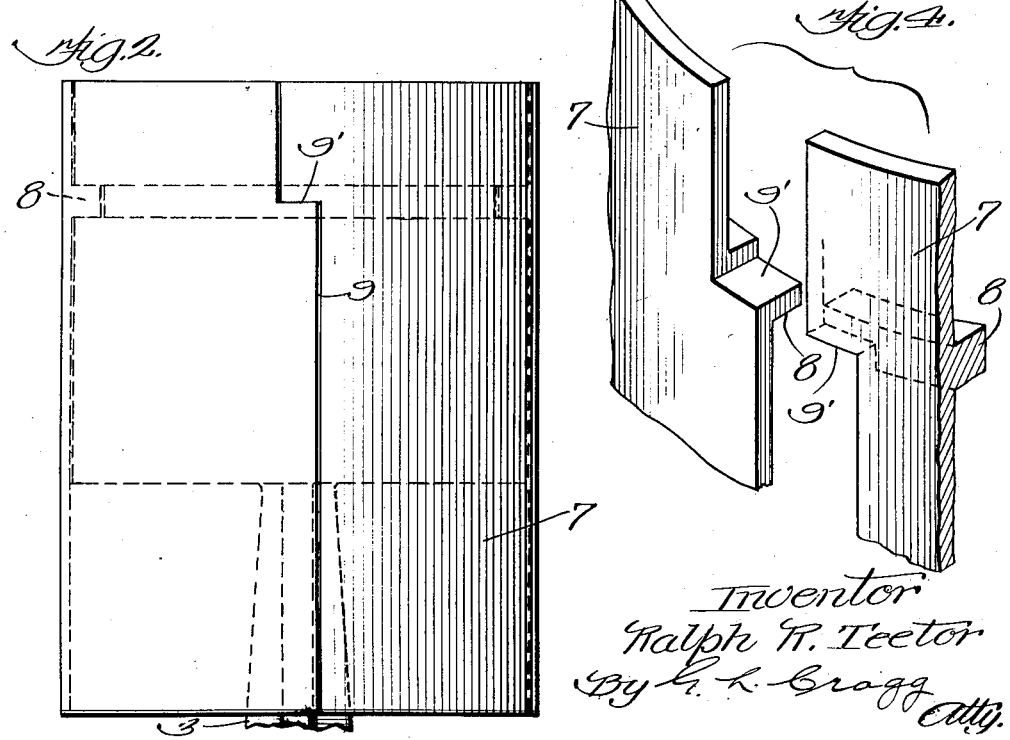
Inventor
Ralph R. Teetor
By G. L. Gragg
Atty.

Patented May 12, 1925.

1,537,631

UNITED STATES PATENT OFFICE.

RALPH R. TEETOR, OF HAGERSTOWN, INDIANA.

PISTON.

Application filed May 17, 1924. Serial No. 713,995.

*To all whom it may concern:*

Be it known that I, RALPH R. TEETOR, a citizen of the United States, residing at Hagerstown, in the county of Wayne and the State of Indiana, have invented a certain new and useful Improvement in Pistons, of which the following is a full, clear, concise, and exact description.

My invention relates to mechanism employing cylinders and pistons therein which are in reciprocating relation. The invention has for its object the construction of a piston which will expand and contract throughout its length transversely thereof to maintain its sliding fit with and within the bore of the enclosing cylinder.

In accordance with my invention, the body member of the piston—that member with which the piston rod or pitman is connected—has a sleeve of spring material such as cast iron or steel, or other sufficiently resilient metal, assembled therewith, this sleeve being split from end to end to enable it to be transversely expansible and contractible throughout its length with respect to the piston body member to maintain its fit within the bore of the cylinder that contains the piston.

The invention will be more fully explained in connection with the accompanying drawing in which—

Fig. 1 is an axial sectional of the preferred form of piston and a portion of the enclosing cylinder;

Fig. 2 is an elevation of the piston;

Fig. 3 is a plan view; and

Fig. 4 is a perspective view of a part of the piston sleeve with the slit therein widened to illustrate the preferred formation thereof.

The cylinder, or hollow member, is of any suitable shape and has a cylindrical bore which receives my improved piston.

The piston has a body member 2 that affords a means of assembling the connecting rod or pitman 3 with the piston, this member being continued to form a piston end wall 4. In the construction shown the pitman is assembled with the piston by means of the pitman wrist pin 5 received in the bearings 6 carried by the piston body. The piston also includes a cylindrical sleeve 7 of spring material, such as cast iron, steel, or other sufficiently resilient metal, formed with an internal annular shoulder 8 intermediate its ends. The sleeve 7 has a slit 9 therethrough which splits the sleeve from end to end to permit the sleeve to expand and contract throughout its length transversely of the sleeve, the sleeve being contracted within a suitable limit and under all working conditions by the cylinder to always maintain suitable working fit between the sleeve and cylinder. Sufficient lateral clearance exists between the piston sleeve and piston body to permit of greater contraction of the cylinder. The sleeve, thus formed, may be assembled with the piston body by means of a nut 11 screwed upon this body against a shoulder 12 into close proximity with the sleeve shoulder 8 to maintain this shoulder upon its seat 10. The annular gap between the nut 11 and the shoulder 10 is slightly wider than the shoulder so that the piston sleeve is free to contract and expand at the sleeve shoulder as well as elsewhere.

In order to obstruct the flow of fluid lengthwise of the piston through the slit 9, I make this slit zigzag with the apposed margins of the intermediate section 9' of the slit substantially in contact and in a plane perpendicular to the axis of the sleeve. In the preferred embodiment of the invention, the slit section 9' is formed through the shoulder 8 as indicated in Fig. 4.

The piston of my invention needs no packing rings, though the invention is not to be limited to the absence thereof. The piston finds very useful employment in the construction of engines, though it is not to be limited to much use.

Changes may readily be made without departing from my invention.

Having thus described my invention, I claim:—

The combination with a hollow member having a cylindrical bore; of a piston including a body member and a cylindrical sleeve of spring material in sliding fit with the hollow member within its bore, said sleeve having an internal shoulder formed at an intermediate part thereof seated upon the body member of the piston; a nut screwed upon the piston body member into close but non-clamping relation with said shoulder to retain said shoulder close to its seat, said sleeve being split lengthwise to make it transversely expansible and contractible with respect to said body member to maintain its fit with said hollow member.

In witness whereof, I hereunto subscribe my name.

RALPH R. TEETOR.